United States Patent
Hsu

(10) Patent No.: US 10,444,603 B2
(45) Date of Patent: Oct. 15, 2019

(54) COMBINATIONAL ELECTRONIC APPARATUS

(71) Applicant: CANSONIC INC., New Taipei (TW)

(72) Inventor: Chao-Chih Hsu, New Taipei (TW)

(73) Assignee: CANSONIC INC., New Taipei (TW)

( * ) Notice: Subject to any disclaimer, the term of this patent is extended or adjusted under 35 U.S.C. 154(b) by 0 days.

(21) Appl. No.: 15/952,979

(22) Filed: Apr. 13, 2018

(65) Prior Publication Data

US 2019/0235353 A1    Aug. 1, 2019

(30) Foreign Application Priority Data

Feb. 1, 2018    (TW) .............................. 107201591 U

(51) Int. Cl.
   *G03B 17/56*    (2006.01)
   *F16J 15/02*    (2006.01)
   (Continued)

(52) U.S. Cl.
   CPC .............. *G03B 17/561* (2013.01); *F16B 1/00* (2013.01); *F16J 15/022* (2013.01); *F16M 11/04* (2013.01);
   (Continued)

(58) Field of Classification Search
   CPC ........................................................ F16B 1/00
   (Continued)

(56) References Cited

U.S. PATENT DOCUMENTS 5,262,813 A * 11/1993 Scharton .................. B60R 1/12
                                                        396/429
6,124,886 A *  9/2000 DeLine ................. B60Q 1/2665
                                                        348/148
(Continued)

FOREIGN PATENT DOCUMENTS

CN    WO2016/107608    7/2016
CN    WO2017/124639    7/2017
(Continued)

OTHER PUBLICATIONS

English Abstract for DE202017103787, WO2017/124639, and WO2016/107608.
(Continued)

*Primary Examiner* — Clayton E. LaBalle
*Assistant Examiner* — Kevin C Butler
(74) *Attorney, Agent, or Firm* — Lynette Wylie; Apex Juris, Pllc.

(57) ABSTRACT

An electronic apparatus has an electronic module and a connection assembly. The electronic module has a first housing and a first connection portion. The first connection portion is recessed in the first housing and has a first magnetic attraction element and a first buckle assembly. The first buckle assembly is disposed on ends of at least one diagonal line of the first connection portion. The connection assembly is detachably connected with the electronic module and has a second housing and a second connection portion. The second connection portion is formed as a protrusion corresponding to the recessed first connection (Continued)

portion in shape, and has a second magnetic attraction element and a second buckle assembly. The second buckle assembly is disposed on ends of at least one diagonal line of the second connection portion and is detachably engaged with the first buckle assembly.

7 Claims, 5 Drawing Sheets

(51) Int. Cl.
| | |
|---|---|
| F16B 1/00 | (2006.01) |
| F16M 11/12 | (2006.01) |
| F16M 11/10 | (2006.01) |
| F16M 11/04 | (2006.01) |
| F16M 11/18 | (2006.01) |

(52) U.S. Cl.
CPC .............. *F16M 11/10* (2013.01); *F16M 11/12* (2013.01); *F16M 11/18* (2013.01); *F16B 2001/0035* (2013.01)

(58) Field of Classification Search
USPC ......................................................... 396/428
See application file for complete search history.

(56) References Cited

U.S. PATENT DOCUMENTS

| | | | | |
|---|---|---|---|---|
| 8,917,169 | B2* | 12/2014 | Schofield | B60N 2/002 340/425.5 |
| 9,681,029 | B2* | 6/2017 | Harrison | H04N 5/2252 |
| 9,862,323 | B2* | 1/2018 | Schofield | B60R 1/04 |
| 9,900,480 | B1* | 2/2018 | Hsu | H04N 5/2252 |
| 10,110,860 | B1* | 10/2018 | Schofield | G06K 9/00818 |
| 2002/0003571 | A1* | 1/2002 | Schofield | B60C 23/00 348/148 |
| 2006/0038668 | A1* | 2/2006 | DeWard | B60R 11/04 340/438 |
| 2009/0106029 | A1* | 4/2009 | DeLine | B60R 1/12 704/275 |
| 2010/0152964 | A1* | 6/2010 | Hashimoto | G07C 5/085 701/33.4 |
| 2012/0310519 | A1* | 12/2012 | Lawlor | B60R 1/12 701/301 |
| 2014/0191096 | A1* | 7/2014 | Wiercinski | F16M 13/022 248/206.5 |
| 2014/0247390 | A1* | 9/2014 | Ohsumi | B60R 11/04 348/373 |
| 2016/0119514 | A1* | 4/2016 | Sugimura | G03B 17/55 348/148 |
| 2016/0234407 | A1* | 8/2016 | Wang | H04N 5/2252 |
| 2017/0057423 | A1* | 3/2017 | Wang | B60R 11/04 |
| 2017/0240112 | A1* | 8/2017 | Chen | G02B 27/0149 |
| 2018/0077378 | A1* | 3/2018 | Satoh | H04N 5/23241 |

FOREIGN PATENT DOCUMENTS

| | | |
|---|---|---|
| DE | 202017103787 | 10/2017 |
| GB | 2556113 | 5/2018 |

OTHER PUBLICATIONS

Search Report of corresponding GB Application No. 1806478.2, dated Oct. 18, 2018.

* cited by examiner

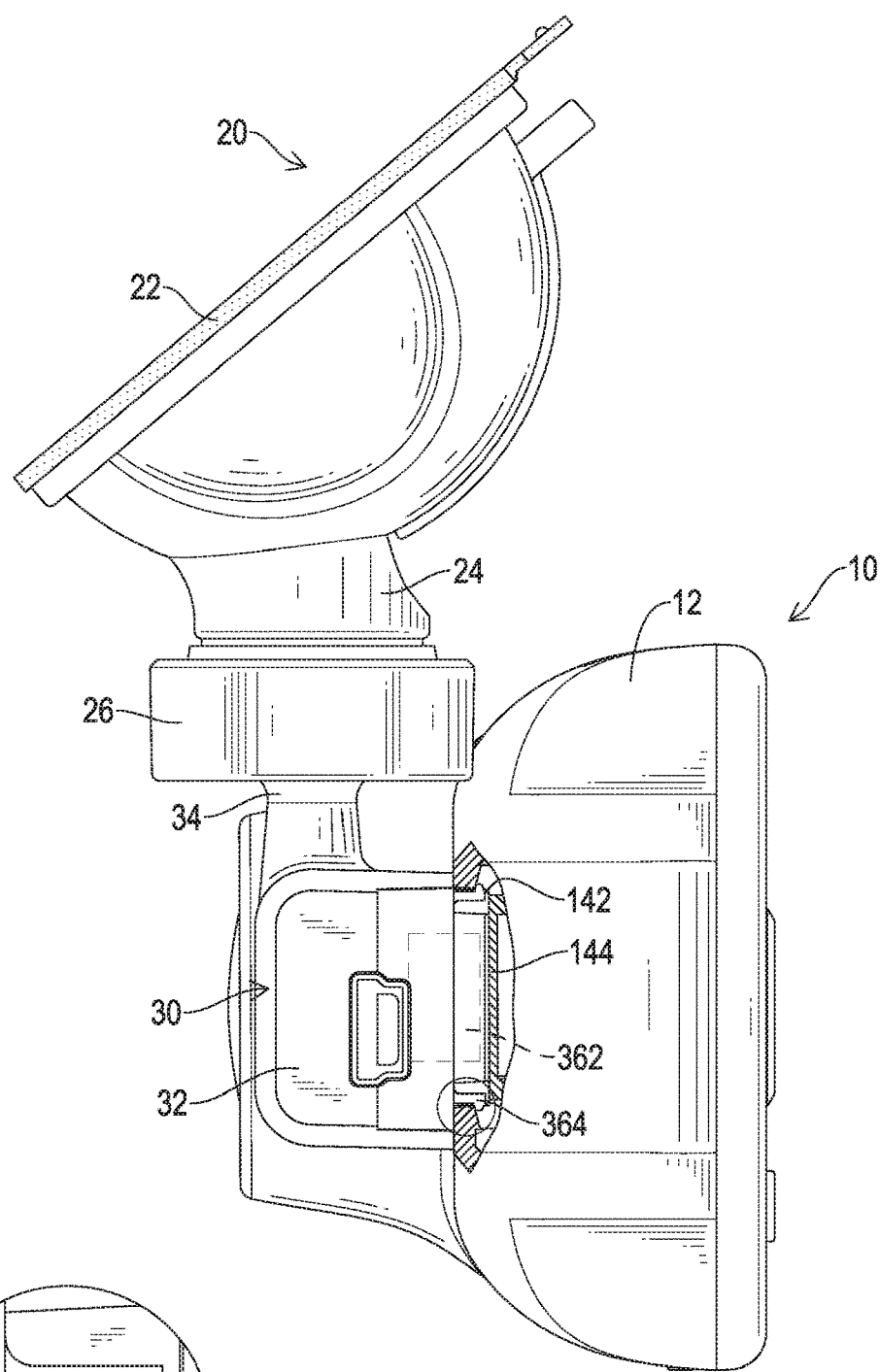
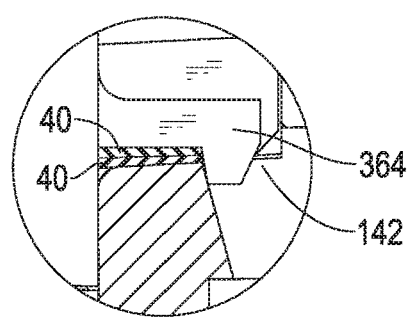
FIG.3
FIG.3A

COMBINATIONAL ELECTRONIC APPARATUS

BACKGROUND OF THE INVENTION

1. Field of the Invention

The present invention relates to an electronic apparatus, and more particularly to a combinational electronic apparatus that can be combined with an L-shaped magnetic connecting device.

2. Description of Related Arts

Electronic apparatuses are important tools in daily life. To improve the convenience of using electronic apparatuses, various electronic apparatuses with different functions may be connected with each other. For example, a driving recorder may be connected with a global positioning system (GPS) to obtain the positioning data.

A conventional driving recorder substantially comprises a fixing base and a recorder. The fixing base is adapted to be attached to a windscreen of a vehicle. The recorder is adjustably connected with the fixing base and comprises a video lens and a display to record the motion pictures.

However, the fixing base of the conventional driving recorder is connected with a top surface of the recorder, so when the recorder is attached to the windscreen, a vertical distance from the recorder to the windscreen is relatively long. With the long vertical distance, the recorder is easily detached from the fixing base due to vibration or inertia when the vehicle is driving on a bumpy road or during an emergency brake. Therefore, the conventional driving recorder is not convenient in use and may cause negative influence on driving safety.

To overcome the shortcomings, the present invention tends to provide a combinational electronic apparatus to mitigate or obviate the aforementioned problems.

SUMMARY OF THE INVENTION

The main objective of the invention is to provide a combinational electronic apparatus that is easily combined and detached and has a reduced vertical distance between the electronic apparatus and a surface to which the electronic apparatus is attached.

The electronic apparatus has an electronic module and a connection assembly. The electronic module has a first housing and a first connection portion. The first connection portion is disposed on and recessed in the first housing and has a first magnetic attraction element and a first buckle assembly. The first magnetic attraction element is mounted in the first housing. The first buckle assembly is disposed on ends of at least one diagonal line of the first connection portion. The connection assembly is detachably connected with the electronic module and has a second housing and a second connection portion. The second connection portion is disposed on the second housing, is formed as a protrusion corresponding to the recessed first connection portion in shape, and has a second magnetic attraction element and a second buckle assembly. The second magnetic attraction element is mounted in the second housing at a position where the second magnetic attraction element is magnetically attracted to the first magnetic attraction element. The second buckle assembly is disposed on ends of at least one diagonal line of the second connection portion and is detachably engaged with the first buckle assembly.

Other objects, advantages and novel features of the invention will become more apparent from the following detailed description when taken in conjunction with the accompanying drawings.

BRIEF DESCRIPTION OF THE DRAWINGS

FIG. 2A is an enlarged perspective view of the combinational electronic apparatus in partial section in FIG. 2;

FIG. 3 is a side view in partial section of the combinational electronic apparatus in partial section in FIG. 1;

FIG. 3A is an enlarged side view in partial section of the combinational electronic apparatus in partial section in FIG. 3;

DETAILED DESCRIPTION OF PREFERRED EMBODIMENT

Figure 1:
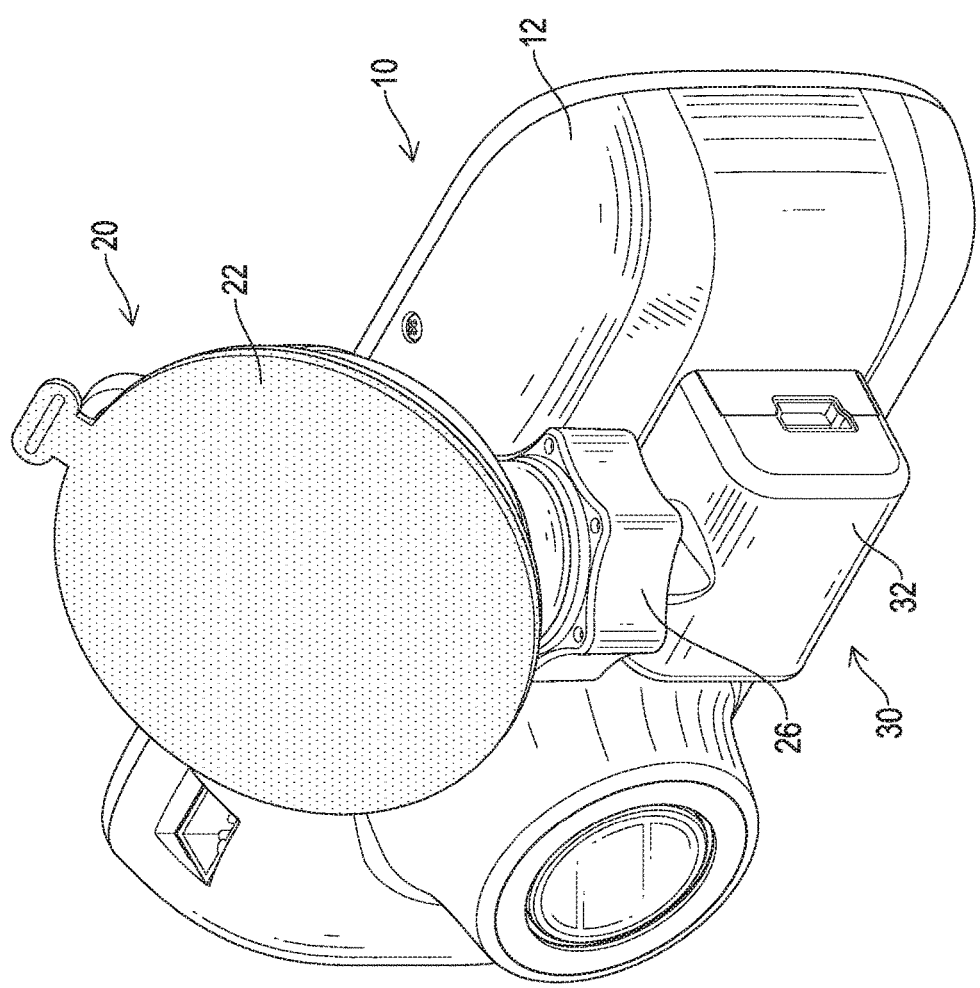
FIG. 1 is a perspective view of a first embodiment of a combinational electronic apparatus in accordance with the present invention.
Figure 2:
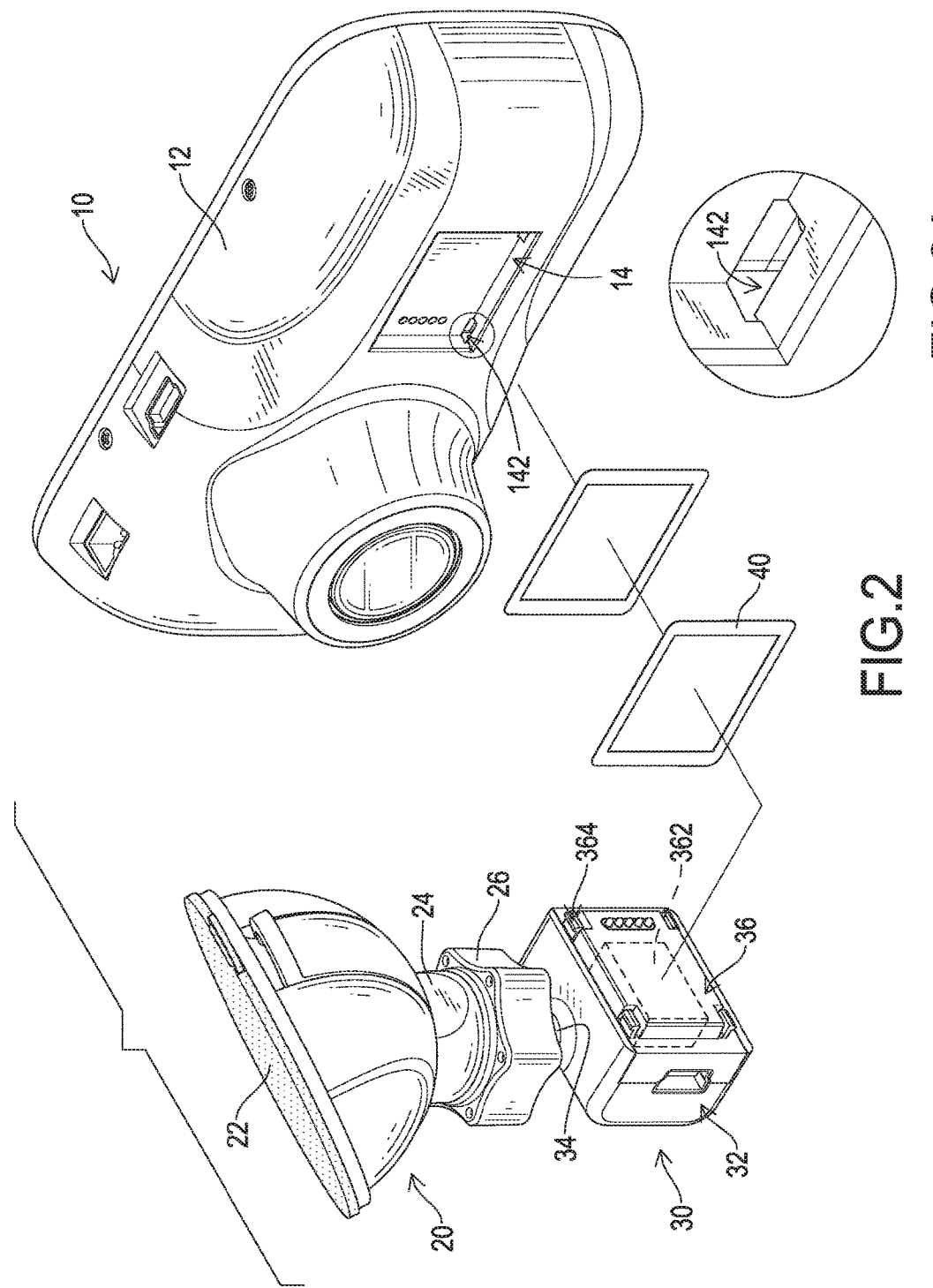
FIG. 2 is an exploded perspective view of the combinational electronic apparatus in partial section in FIG. 1.

With reference to FIGS. 1 to 3A, a combinational electronic apparatus in accordance with the present invention comprises an electronic module 10 and a connection assembly.

The electronic module 10 may be a driving recorder that has a video lens for recording motion pictures and a memory for storing the motion pictures. The electronic module 10 comprises a first housing 12 and a first connection portion 14. The first housing 12 is formed as the outer casing of the electronic module 10. The first connection portion 14 is disposed on a rear surface of the first housing 12. Preferably, the first connection portion 14 comprises a cavity recessed in a surface of the first housing 12 on which the video lens is mounted and being rectangular in shape. The first connection portion 14 has a first buckle assembly 142 and a first magnetic attraction element 144.

The first buckle assembly 142 is mounted on ends of at least one diagonal line of the first connection portion 14. Preferably, the first buckle assembly 142 comprises four engaging portions defined respectively in four corners of the first buckle assembly 142. Each engaging portion may be a recess or a hook. The first magnetic attraction element 144 is mounted in the first housing 12.

The connection assembly comprises a fixing base 20 and a connection device 30. The fixing base 20 comprises a fixing segment 22, a connecting segment 24, and an angle-controlling ring 26. The fixing segment 22 can be securely attached to a flat surface, such as a windscreen of a vehicle. The connecting segment 24 is connected with the fixing segment 22 and can protrude from one end of the fixing segment 22. The connection segment 24 has an end opposite the fixing segment 22 and provided with an adjusting member. The adjusting member has a thread formed on the outer surface of the adjusting member and a concave space defined in the adjusting member. The angle-controlling ring 26 is mounted rotatably around the connecting segment 24. Preferably, the angle-controlling ring 26 is threaded with the thread on the adjusting member, and the concave space is formed between the adjusting member and the angle-controlling ring 26.

The connection device 30 is connected adjustably with the fixing base 20 and comprises a second housing 32, an extension member 34, and a second connection portion 36. The connection device 30 may have a global positioning system (GPS) arranged inside the connection device 30.

The extension member 34 is formed on and protrudes from the second housing 32 and has a spherical end. The spherical end is rotatably mounted in the concave space in the adjusting member, and the extension member 34 is clamped between the adjusting member and the angle-controlling ring 26. When the angle-controlling ring 26 is threaded tightly with the adjusting member, the concave space is reduced to prevent the extension member 34 from rotating relative to the fixing base 20. Accordingly, the angle between the connection device 30 and the fixing base 20 is fixed. Thus, the angle between the connection device 30 and the fixing base 20 can be adjusted after the angle-controlling ring 26 is unthreaded from the adjusting member.

The second connection portion 36 is disposed on the second housing 32. In the preferable embodiment, the second connection portion 36 is formed as a protrusion corresponding to the recessed first connection portion 14 in shape. The second connection portion 36 has a second buckle assembly 364 and a second magnetic attraction element 362. The second buckle assembly 364 is disposed on ends of at least one diagonal line of the second connection portion 36. Preferably, the second buckle assembly 364 comprises four resilient engaging tabs formed respectively on four corners of the second connection portion 364 and are selectively engaged with the four engaging portions of the first buckle assembly 142. The second magnetic attraction element 362 is mounted in the second housing 32 at a position where the second magnetic attraction element 362 is magnetically attracted to the first magnetic attraction element 144.

In addition, at least one resilient annular gasket 40 is disposed between the first connection portion 14 and the second connection portion 36.

In use, the fixing base 20 is securely attached to a flat surface, such as a windscreen of a vehicle. The electronic module 10 is connected with the connection device 30 by the engagements of the engaging recesses of the first buckle assembly 142 and the resilient tabs of the second buckle assembly 364. Accordingly, the electronic module 10 can be conveniently and easily combined with the connection device 30.

In addition, with the magnetic attraction force of the magnetic attraction elements 144, 362, the combination between the electronic module 10 and the connection device 30 is firm. Because the first connection portion 14 is disposed on the rear surface of the first housing 12 of the electronic module 10, the vertical distance from the electronic module 10 to the surface to which the fixing base 20 is attached can be effectively reduced. Accordingly, the electronic module 10 is not detached from the connection device 30 even when the vehicle is driving on a bumpy road or during an emergency brake.

Furthermore, with the reduced vertical distance from the electronic module 10 to the surface to which the electronic apparatus is attached, the overall appearance of the electronic apparatus in accordance with the present invention can be effectively flattened. Therefore, when the electronic apparatus is attached to a windscreen of a vehicle, the electronic apparatus can be hidden behind a rearview mirror of the vehicle. Consequently, the arrangement of the electronic apparatus will not interfere with the sight of the driver, and the safety of driving can be improved. In addition, the appearance of the inside of the vehicle is neat.

Figure 4:
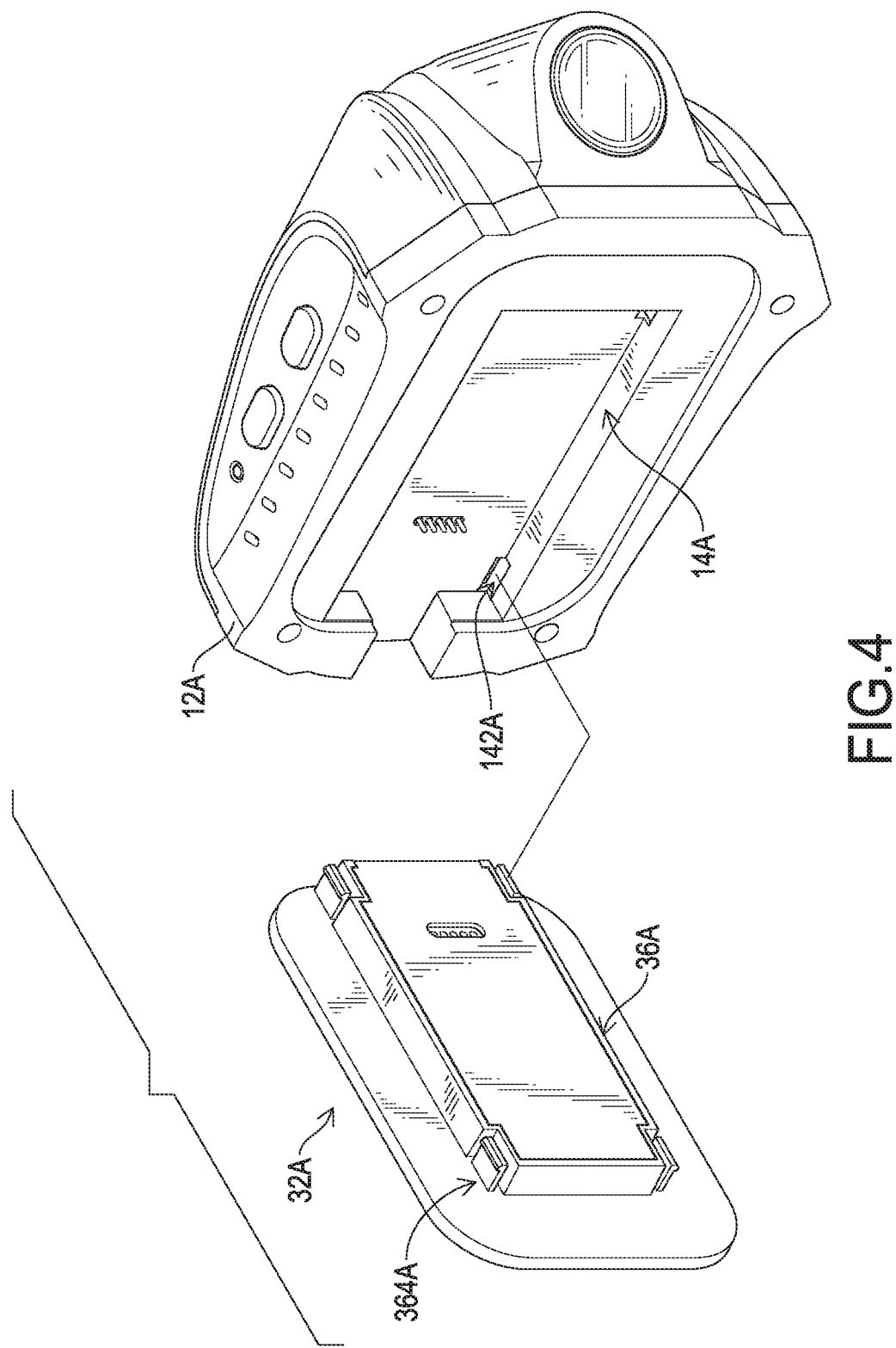
FIG. 4 is an exploded perspective view of a second embodiment of a combinational electronic apparatus in accordance with the present invention.

With reference to FIG. 4, in the second embodiment, the second housing 32A of the connection assembly is formed as a board, and the second connection portion 36A is formed on and protrudes from a side surface of the second housing 32A to connect with the first connection portion 14 A on the first housing 12A. The second buckle assembly 364A of the second connection portion 36A comprises multiple resilient hooks formed on ends of at least one diagonal line of the second connection portion 36A to engage with the first buckle assembly 142A comprising multiple engaging recesses defined in ends of at least one diagonal line of the first connection portion 14A.

Figure 5:
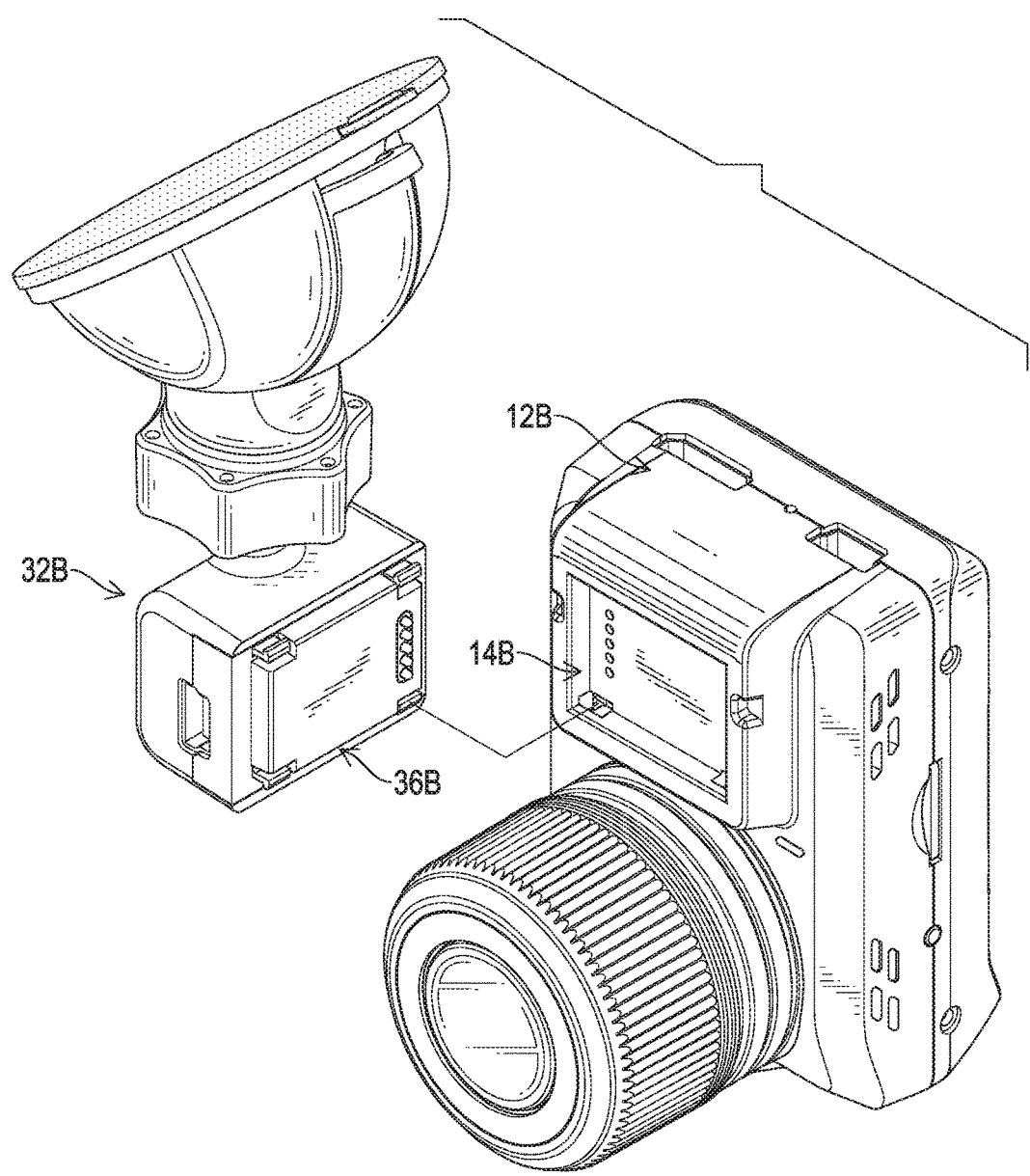
FIG. 5 is an exploded perspective view of a third embodiment of a combinational electronic apparatus in accordance with the present invention.

With reference to FIG. 5, in the third embodiment, the second connection portion 36B and the first connection portion 14B can be applied to connect the first housing 12B and the second housing 32B in different shapes.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic apparatus comprising:
an electronic module having
   a first housing; and
   a first connection portion disposed on and recessed in the first housing and having
     a first magnetic attraction element mounted in the first housing; and
     a first buckle assembly disposed on ends of at least one diagonal line of the first connection portion; and
a connection assembly detachably connected with the electronic module and having
   a second housing; and
   a second connection portion disposed on the second housing, formed as a protrusion corresponding to the recessed first connection portion in shape, and having
     a second magnetic attraction element mounted in the second housing at a position where the second magnetic attraction element is magnetically attracted to the first magnetic attraction element; and
     a second buckle assembly disposed on ends of at least one diagonal line of the second connection portion and detachably engaged with the first buckle assembly, wherein
the connection assembly comprises a fixing base and a connecting device connected adjustably with the fixing base;
the second housing and the second connection portion are disposed on the connecting device.

2. The electronic apparatus as claimed in claim 1, wherein the fixing base comprises
a fixing segment;
a connecting segment connected with the fixing segment and connected rotatably with the electronic device; and
an angle-controlling ring mounted rotatably around the connecting segment.

3. The electronic apparatus as claimed in claim 2 further comprising at least one resilient annular gasket disposed between the first connection portion and the second connection portion.

4. The electronic apparatus as claimed in claim 1, wherein the first buckle assembly comprises four engaging portions defined respectively in four corners of the first connection portion; and the second buckle assembly comprises four resilient engaging tabs formed respectively on four corners of the second connection portion and selectively engaged with the four engaging portions of the first buckle assembly.

5. The electronic apparatus as claimed in claim 4 further comprising at least one resilient annular gasket disposed between the first connection portion and the second connection portion.

6. The electronic apparatus as claimed in claim 4, wherein the second housing of the connection assembly is formed as a board; and the second connection portion is formed on and protrudes from a side surface of the second housing.

7. An electronic apparatus comprising:
an electronic module having
a first housing; and
a first connection portion disposed on and recessed in the first housing and having
a first magnetic attraction element mounted in the first housing; and
a first buckle assembly disposed on ends of at least one diagonal line of the first connection portion; and
a connection assembly detachably connected with the electronic module and having
a second housing; and
a second connection portion disposed on the second housing, formed as a protrusion corresponding to the recessed first connection portion in shape, and having
a second magnetic attraction element mounted in the second housing at a position where the second magnetic attraction element is magnetically attracted to the first magnetic attraction element;
a second buckle assembly disposed on ends of at least one diagonal line of the second connection portion and detachably engaged with the first buckle assembly; and
at least one resilient annular gasket disposed between the first connection portion and the second connection portion.

* * * * *